United States Patent
Nam

(10) Patent No.: US 8,976,815 B2
(45) Date of Patent: Mar. 10, 2015

(54) METHOD AND APPARATUS FOR SHARING CONTENTS BETWEEN DEVICES

(75) Inventor: Koong-Hyuk Nam, Suwon-si (KR)

(73) Assignee: Samsung Electronics Co., Ltd, Suwon-Si (KR)

(*) Notice: Subject to any disclaimer, the term of this patent is extended or adjusted under 35 U.S.C. 154(b) by 338 days.

(21) Appl. No.: 13/370,223

(22) Filed: Feb. 9, 2012

(65) Prior Publication Data

US 2012/0207180 A1    Aug. 16, 2012

(30) Foreign Application Priority Data

Feb. 10, 2011    (KR) .................. 10-2011-0011775

(51) Int. Cl.
*H04J 99/00*    (2009.01)
*H04L 29/06*    (2006.01)

(52) U.S. Cl.
CPC .................................. *H04L 65/605* (2013.01)
USPC ....................................................... 370/475

(58) Field of Classification Search
CPC ............. H04L 12/2812; H04L 65/605; H04N 21/43615
USPC .................................................. 370/338, 475
See application file for complete search history.

(56) References Cited

U.S. PATENT DOCUMENTS

| | | | |
|---|---|---|---|
| 2008/0040403 A1* | 2/2008 | Hayashi | 707/204 |
| 2010/0050124 A1* | 2/2010 | Douillet et al. | 715/838 |
| 2010/0198915 A1* | 8/2010 | Mashita et al. | 709/203 |
| 2010/0268765 A1* | 10/2010 | Honjo | 709/203 |
| 2011/0087759 A1* | 4/2011 | You | 709/219 |
| 2012/0232684 A1* | 9/2012 | Lee | 700/94 |
| 2013/0232528 A1* | 9/2013 | Hiroi et al. | 725/38 |

* cited by examiner

*Primary Examiner* — Paul H Masur

(57) ABSTRACT

A method and apparatus for shortening a time for a contents receiving device to reproduce contents provided from a contents providing device. The method includes receiving headers of respective contents in advance from a contents providing device, verifying whether a header of selected contents is already received when the corresponding contents are selected, receiving contents data of the selected contents from the contents providing device when the header of the selected contents is already received, and reproducing the selected contents using the received corresponding header and contents data.

20 Claims, 7 Drawing Sheets

METHOD AND APPARATUS FOR SHARING CONTENTS BETWEEN DEVICES

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Feb. 10, 2011 and assigned Serial No. 10-2011-0011775, the entire disclosure of which is hereby incorporated by reference.

TECHNICAL FIELD

The present disclosure relates to a method and apparatus for sharing contents between devices. More particularly, the present disclosure relates to a method and apparatus for shortening a time for a contents receiving device to reproduce contents provided from a contents providing device.

BACKGROUND

Electronic devices such as mobile terminals, personal complex terminals, and digital TV sets have become necessities of current society based on development of electronic communication industries. The electronic devices have been developed into important means of information transmission, which can quickly change. Internet access has been propagated to the electronic device, and the electronic device has provided a variety of media contents based on the Internet.

Notably, recently, these electronic devices may share media contents such as music and photos with one another. For example, a number of electronic devices may have a Digital Living Network Appliance (DLNA) function. Electronic devices with a WiFi wireless network function may reproduce media contents with one another through an Access Point (AP) by a wireless home network technical standard using the DLNA function.

FIG. 1A illustrates a general data structure of contents.

Referring to FIG. 1A, contents 100 includes a header 101 and contents data 103. The contents data 103 denotes data to be actually transmitted, and the header 101 denotes data supplementing the contents data. For example, in image contents, a header may denote information such as a size of an image, resolution of the image, and the number of colors.

FIG. 1B is a communication flowchart illustrating a general process of sharing contents between devices.

Referring to FIG. 1B, a contents receiving device and a contents providing device are connected wirelessly or by wire (block 101). If one of a plurality of contents provided from the contents providing device is selected at the contents receiving device (block 103), the contents receiving device requests the contents providing device to transmit a header of the selected contents (block 105). The contents providing device transmits the header of the selected contents to the contents receiving device (block 107). The contents receiving device requests the contents providing device to transmit contents data of the selected contents (block 109). The contents providing device transmits the contents data of the selected contents to the contents receiving device (block 111). The contents receiving device reproduces the corresponding contents using the received header and contents data (block 113). As described above, the contents receiving device sequentially requests the contents providing device to transmit a header and contents data of contents to be reproduced and receives the requested header and contents data. In this process, time until the corresponding contents are reproduced is delayed.

SUMMARY

To address the above-discussed deficiencies of the prior art, it is a primary object to provide at least the advantages described below. Accordingly, an aspect of the present disclosure is to provide a method and apparatus for shortening time when a contents receiving device reproduces contents provided from a contents providing device.

Another aspect of the present disclosure is to provide a method and apparatus for receiving a header for contents included in a contents providing device in advance at a contents receiving device and shortening time associated with reproducing contents selected later.

In accordance with an aspect of the present disclosure, a method of sharing contents between devices is provided. The method includes receiving headers of respective contents in advance from a contents providing device, verifying whether a header of selected contents is already received when the corresponding contents are selected, receiving contents data of the selected contents from the contents providing device when the header of the selected contents is already received, and reproducing the selected contents using the received corresponding header and contents data.

In accordance with another aspect of the present disclosure, an apparatus for sharing contents between devices is provided. The apparatus includes a memory configured to store displayed target data, a display unit configured to decode the data stored in the memory and output a picture signal, and an input unit configured to receive user input. The apparatus also includes a communication unit configured to perform communication, and a controller configured to performing an overall operation. The controller receives headers of respective contents in advance from a contents providing device connected wirelessly or by wire, receives contents data of the selected contents from the contents providing device when the header of the selected contents is already received, and reproduces the selected contents using the received corresponding header and contents data.

In accordance with another aspect of the present disclosure, a system for sharing contents between devices is provided. The system includes a contents providing device configured to provide contents. The contents are classified into a header and contents data, and the header and contents data are transmitted. The system also includes a contents receiving device configured to receive the header and the contents data from the contents providing device and reproduce the corresponding contents. The contents receiving device receives headers of respective contents in advance from the contents providing device and reproduces contents selected later using the contents data received from the contents providing device and a header corresponding to the selected contents among the headers received in advance.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Exemplary embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein are to be understood based on the descriptions made herein.

The present disclosure described hereinafter relates to a method and apparatus for shortening a time for a contents receiving device to reproduce contents provided from a contents providing device. In accordance with one embodiment of the present disclosure, a contents receiving device receives headers of contents included in a contents providing device in advance and receives contents data of contents selected later from the contents providing device.

Figure 1A:
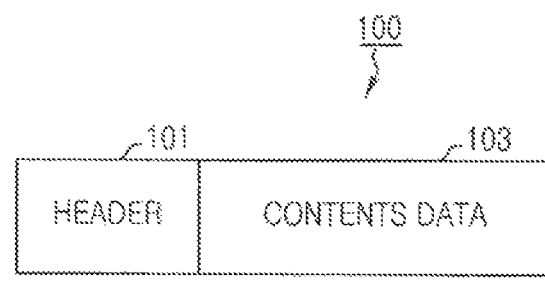
FIG. 1A illustrates a general data structure of contents.
Figure 1B:
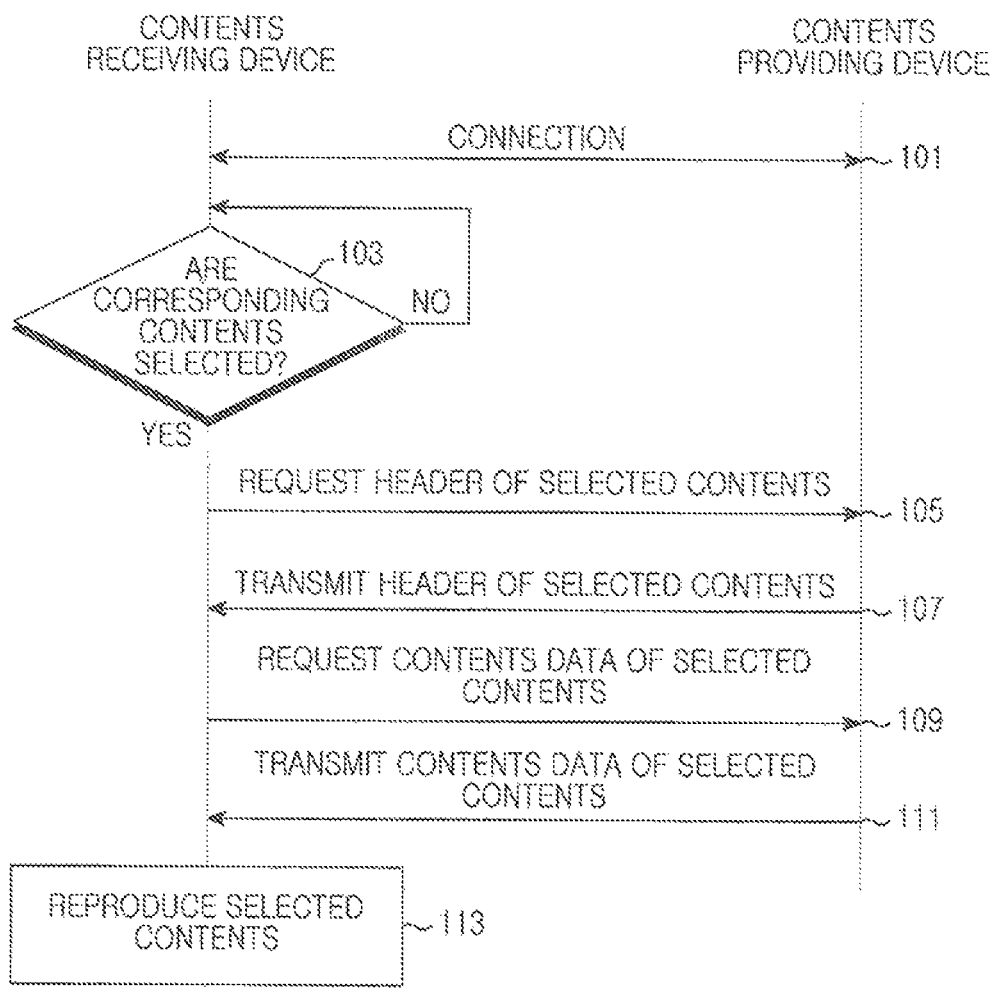
FIG. 1B is a communication flowchart illustrating a general process of sharing contents between device.
Figure 2:
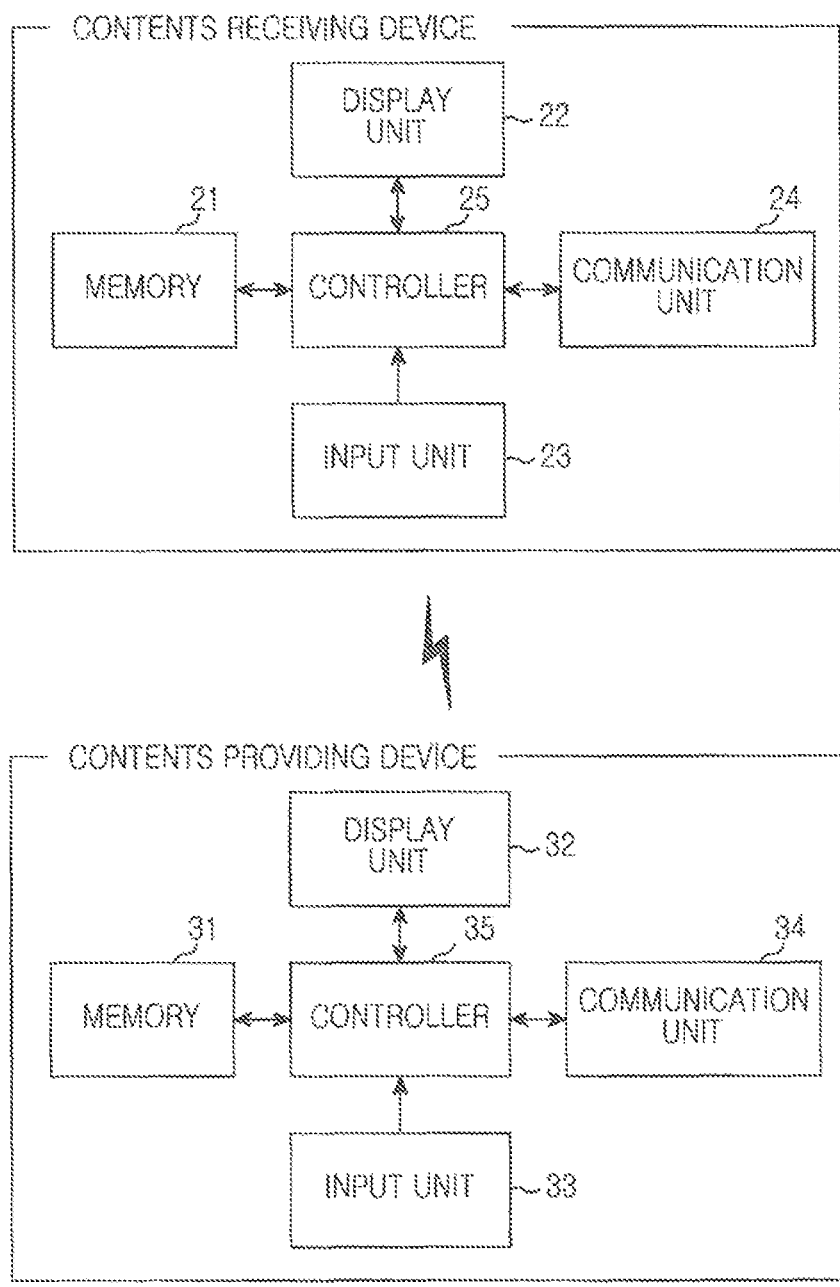
FIG. 2 is a block diagram illustrating a contents sharing system according to one embodiment of the present disclosure.

FIG. 2 is a block diagram of a contents sharing system according to one embodiment of the present disclosure.

Referring to FIG. 2, a contents receiving device and a contents providing device are connected wireless or by wire.

A contents receiving device according to one embodiment of the present disclosure includes a memory 21 for storing a displayed target data, a display unit 22 for decoding the data stored in the memory 21 and outputting a picture signal, an input unit 23 for receiving user input, a communication unit 24 for performing communication, and a controller 25 for performing overall control. Also, a contents providing device according to one embodiment of the present disclosure includes a memory 31 for storing a displayed target data, a display unit 32 for decoding the data stored in the memory 31 and outputting a picture signal, an input unit 33 for receiving user input, a communication unit 34 for performing communication, and a controller 35 for performing overall control.

Each of the input units 23 and 33 receives user input for contents sharing according to one embodiment of the present disclosure. Each of the memories 21 and 31 stores information about an interface environment and contents for contents sharing according to one embodiment of the present disclosure. The memory 21 of the contents receiving device stores a header or contents data received from the contents providing device under control of the controller 25. The controller 25 of the contents receiving device requests the contents providing device to transmit headers of contents by priority. The controller 35 of the contents providing device transmits the headers of the respective contents to the contents receiving device according to the request. The contents receiving device provides a user interface for searching contents included in the contents providing device according to user input, displaying the searched contents on a list, and allowing a user to select contents to be reproduced.

Figure 3:
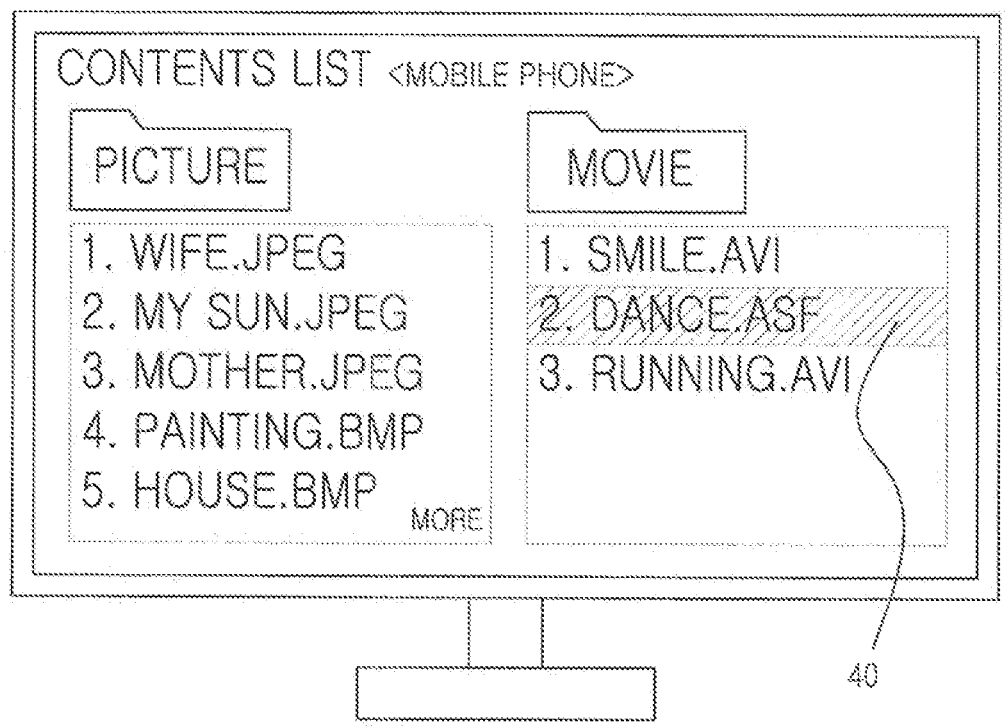
FIG. 3 illustrates a user interface provided on a contents receiving device according to one embodiment of the present disclosure.

FIG. 3 illustrates a user interface provided on a contents receiving device according to one embodiment of the present disclosure.

Herein, it is assumed that a contents providing device is a mobile phone and a contents receiving device is a TV set. The TV set displays a user interface for contents sharing. A user may search contents stored in a counterpart's mobile phone on the user interface. The searched contents may be arranged while being classified according to folders, or may be arranged while being classified according to types of contents (e.g., a photo, music, a moving picture, and the like). In a method of requesting a specific header, the controller 25 of the contents receiving device may request the contents providing device to transmit headers of the contents which are searched and arranged by priority. In other words, if a search is requested, the controller 25 of the contents receiving device may request the contents providing device to transmit headers of the respective contents which are searched and displayed and may receive the requested header in advance. Also, in one embodiment, the controller 25 of the contents receiving device requests the contents providing device to transmit headers of the respective contents throughout communication connection. For example, the controller 25 of the contents receiving device requests the contents providing device to transmit headers which are not yet received and receives the requested headers using a background operation, although corresponding contents are being reproduced.

Accordingly, the controller 25 of the contents receiving device receives only contents data of corresponding contents from the contents providing device to reproduce contents whose header is already received. That is, because a header of contents to be reproduced is received in advance, this means that reproduction time may be reduced by time associated with receiving the header of the contents. In an uncertain status where any contents are selected, headers of random (unspecific) contents may be requested to the contents providing device. However, as described above, headers of contents which are searched and displayed may be calculatedly requested to the contents providing device.

Herein, the memory 21 of the contents receiving device may temporarily store a header or contents data of contents received under control of the controller 25 only when the communication connection with the contents providing device is valid.

Hereinafter, a method of sharing contents according to one embodiment of the present disclosure in the controllers 25 and 35 will be described in detail with reference to the accompanying drawings.

Figure 4:
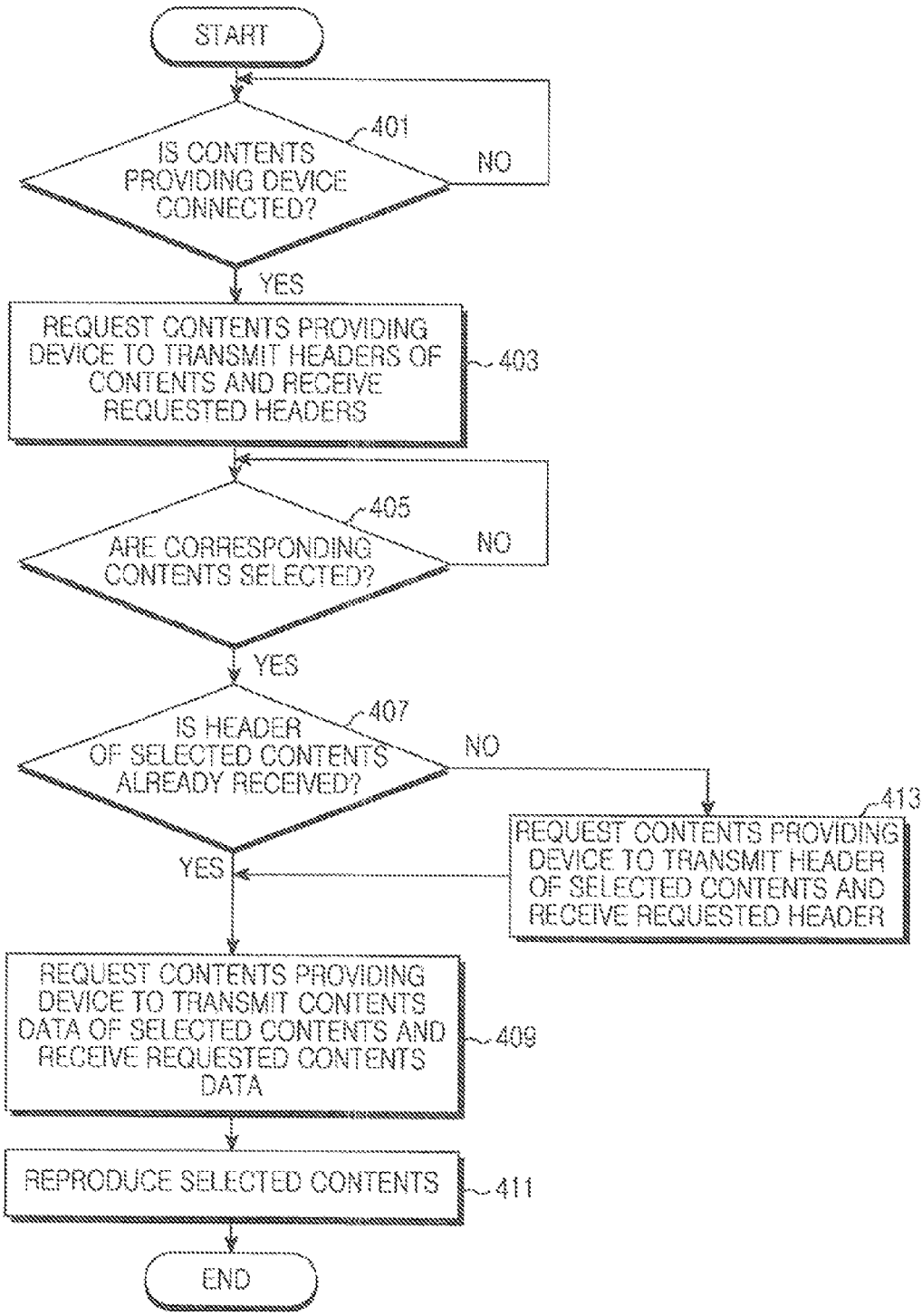
FIG. 4 is a flowchart illustrating a process of reproducing contents of a contents providing device at a contents receiving device according to one embodiment of the present disclosure.

FIG. 4 is a flowchart illustrating a process of reproducing contents of a contents providing device at a contents receiving device according to one embodiment of the present disclosure.

Referring to FIG. 4, the controller 25 of the contents receiving device verifies whether the contents receiving device is connected with the contents providing device wirelessly or by wire (block 401).

If the contents receiving device is connected with the contents providing device, the controller 25 requests the contents providing device to transmit headers of respective contents and receives the requested headers (block 403). As described above, headers of respective contents may be requested throughout communication including a search process through a user interface.

If corresponding contents to be reproduced are selected (block 405), the controller 25 verifies whether a header of the selected contents is already received (block 407).

If the header of the selected contents is already received, the controller 25 requests the contents providing device to transmit contents data of the selected contents and receives the requested contents data (block 409).

However, if the header of the selected contents is not yet received, the controller 25 requests the contents providing device to transmit the header of the selected contents, receives the requested header (block 413), and performs the processing in block 409.

The controller 205 reproduces the selected contents using the received corresponding header and contents data (block 411).

Figure 5:
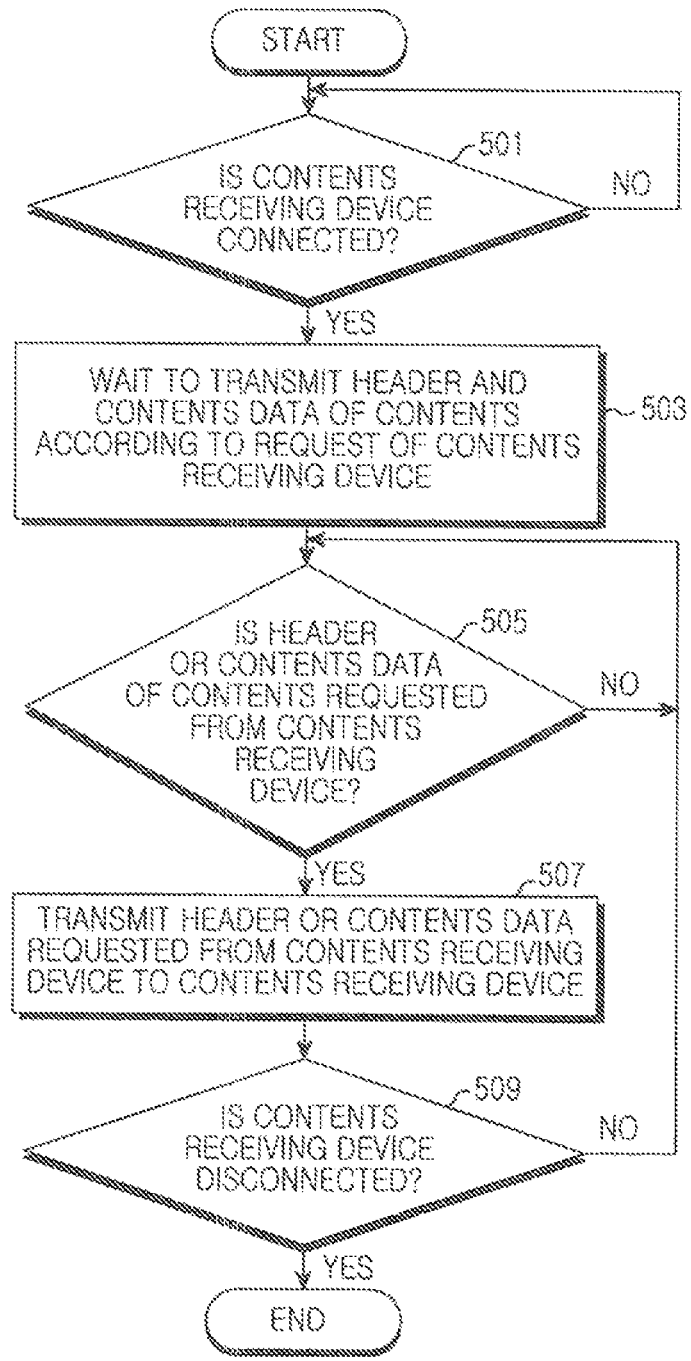
FIG. 5 is a flowchart illustrating a process of providing contents from a contents providing device to a contents receiving device according to one embodiment of the present disclosure.

FIG. 5 is a flowchart illustrating a process of providing contents from a contents providing device to a contents receiving device according to one embodiment of the prevent disclosure.

Referring to FIG. 5, the controller 35 of the contents providing device verifies whether the contents providing device is connected with the contents receiving device wirelessly or by wire (block 501).

If the contents providing device is connected with the contents receiving device, the controller 35 waits to transmit a header or contents data of contents according to a request of the contents receiving device (block 503).

If the header or the contents data of the contents is requested from the contents receiving device (block 505), the controller 35 transmits the corresponding header or contents data to the contents receiving device (block 507).

The controller 35 performs the processing from block 505 until the contents receiving device is disconnected (block 509).

Figure 6:
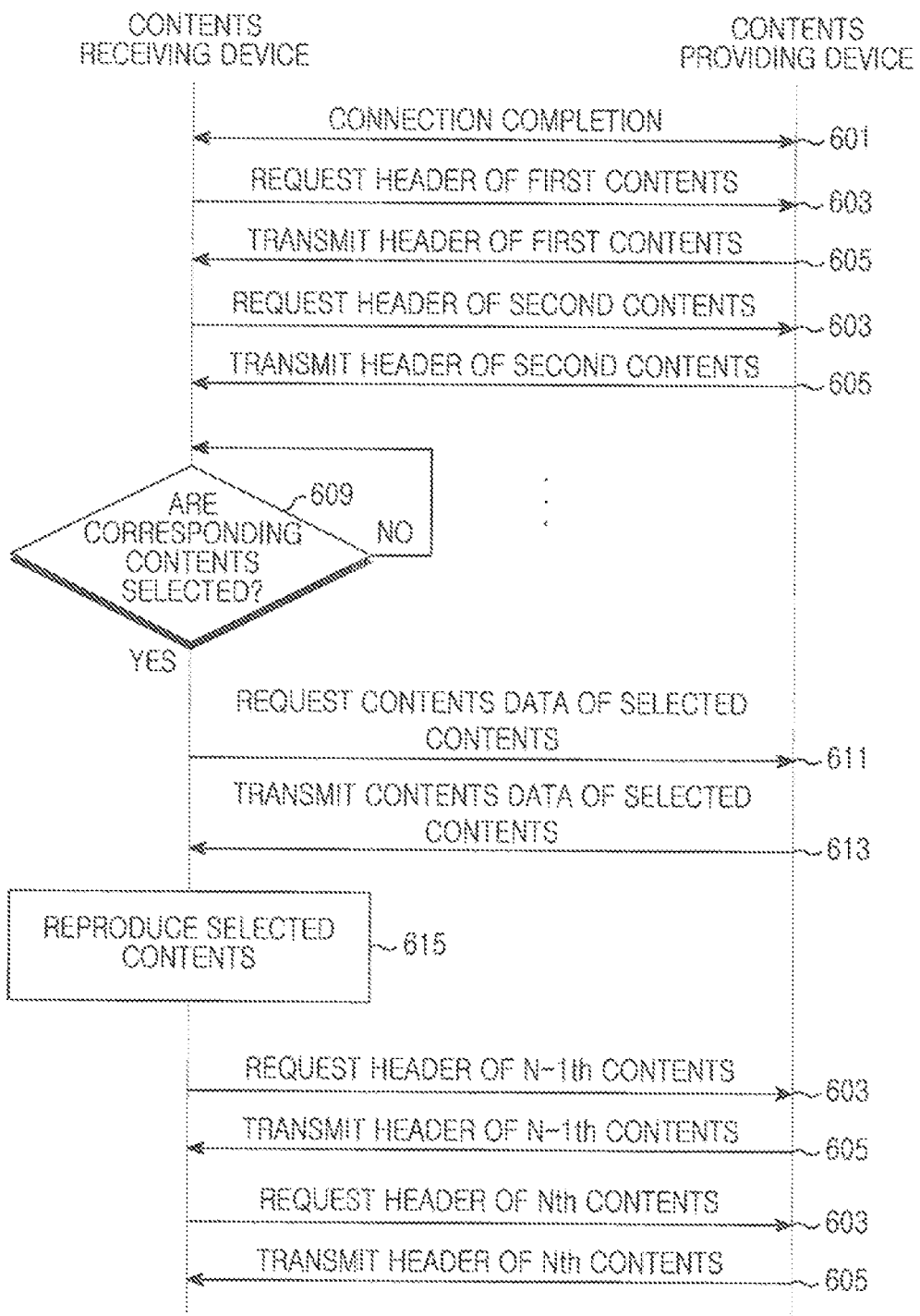
FIG. 6 is a communication flowchart illustrating a process of sharing contents between two devices according to one embodiment of the present disclosure.

FIG. 6 is a communication flowchart illustrating a process of sharing contents between two devices according to one embodiment of the present disclosure.

Referring to FIG. 6, the contents receiving device and the contents providing device are connected wirelessly or by wire (block 601).

The contents receiving device requests the contents providing device to transmit headers of respective contents (first contents, . . . , n–1$^{th}$ contents, and n$^{th}$ contents) (block 603). The contents providing device transmits the headers of the respective contents (first contents, . . . , n–1$^{th}$ contents, and n$^{th}$ contents) to the contents receiving device (block 605). As described above, the processing in blocks 603 and 605 is performed throughout communication connection between the contents receiving device and the contents providing device using a background operation. Also, as described above, the contents receiving device may request the contents providing device to transmit headers of contents searched and displayed through a user interface of the contents receiving device by priority.

If corresponding contents are selected at the contents receiving device (block 609), the contents receiving device requests the contents providing device to transmit contents data of the selected contents (block 611). Herein, it is assumed that a header of the selected contents is already transmitted to the contents receiving device. The contents providing device transmits the corresponding contents data to the contents receiving device (block 613). The contents receiving device reproduces the selected contents using the received corresponding header and contents data (block 615). As described above, the contents receiving device requests the contents providing device to transmit remaining headers of contents which are not received while or after the selected contents are reproduced and continuously receives the requested headers.

A method and apparatus for sharing contents between devices according to one embodiment of the present disclosure may shorten a time for a contents receiving device to reproduce contents provided from a contents providing device to satisfy a user.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An operating method of an electronic device, the method comprising:
   receiving a header comprised in respective content from a content provider in response to detecting that the electronic device is paired with the content provider;
   determining whether a given header of selected given content has already been received in response to detecting that a given content is selected to be reproduced by user input;
   receiving content data comprised in the selected given content from the content provider in response to determining that the given header of the selected given content has already been received; and
   reproducing the selected given content using the received given header and content data.

2. The method of claim 1, further comprising receiving the given header and the content data of the selected given content from the content provider in response to determining that the selected given content is not yet received.

3. The method of claim 1, wherein the receiving of the header comprised in the respective content from the content provider comprises receiving a header of at least one content corresponding to a search request by priority.

4. The method of claim 1, wherein the receiving of the header comprised in the respective content from the content provider comprises:
- searching a plurality of contents included in the content provider according to a search request;
- displaying the searched plurality of contents; and
- receiving headers of the displayed contents in advance from the contents providing device by priority.

5. The method of claim 1, wherein the receiving of the header comprised in the respective content from the content provider is continuously performed during a communication connection using a background operation.

6. The method of claim 1, wherein the electronic device is paired with the content provider wirelessly or by wire.

7. An electronic device comprising:
- a display unit configured to display image data;
- an input unit configured to receive user input;
- a communication unit configured to pair with a content provider; and
- a controller configured to:
  - receive a header comprised in respective content from the content provider in response to detecting that the electronic device is paired with the content provider;
  - determine whether a given header of selected given content has already been received in response to detecting that a given content is selected to be reproduced by the user input;
  - receive content data comprised in the selected given content from the content provider in response to determining that the given header of the selected given content has already been received; and
  - reproduce the selected given content using the received given header and content data.

8. The apparatus of claim 7, wherein the controller is configured to receive the given header and the content data of the selected given content from the content provider in response to determining that the selected given content is not yet received.

9. The apparatus of claim 7, wherein the controller is configured to receive a header of at least one content corresponding to a search request by priority.

10. The apparatus of claim 7, wherein the controller is configured to:
- search a plurality of contents included in the content provider according to a search request;
- display the searched plurality of contents via the display unit; and
- receive headers of the displayed plurality of contents from the content provider by priority.

11. The apparatus of claim 7, wherein the controller is configured to continuously perform the reception operation of the header of the respective content during a communication connection using a background operation.

12. The apparatus of claim 7, wherein the communication unit is paired with the content provider wirelessly or by wire.

13. A system comprising:
- a provider configured to provide a plurality of contents, wherein the plurality of contents are classified into a header and content data; and
- a client configured to receive the header and the content data from the provider,
- wherein the client is configured to:
  - receive a header comprised in respective content from the provider in response to detecting that the electronic device is paired with the provider;
  - determine whether a given header of selected given content has already been received in response to detecting that a given content is selected to be reproduced by a user input;
  - receive content data comprised in the selected given content from the provider in response to determining that the given header of the selected given content has already been received; and
  - reproduce the selected given content using the received given header and content data.

14. The system of claim 13, wherein the provider comprises:
- a memory configured to store a plurality of contents;
- a communication unit configured to pair with the client; and
- a controller configured to transmit the header or the content data to the client in response to request of the client.

15. The system of claim 13, wherein the client comprises:
- an input unit configured to receive the user input;
- a communication unit configured to pair with the provider; and
- a controller configured to perform an overall operation of the client.

16. The system of claim 15, wherein the controller is configured to receive the given header and the content data of the selected given content from the provider in response to determining that the selected given content is not yet received.

17. The system of claim 15, wherein the controller is configured to receive the header of at least one content corresponding to a search request by priority.

18. The system of claim 15, wherein the controller is configured to:
- search a plurality of contents included in the provider according to a search request;
- display the searched plurality of contents via a display unit; and
- receive headers of the displayed plurality of contents from the provider by priority.

19. The system of claim 15, wherein the provider and the client are connected wirelessly.

20. The system of claim 15, wherein the provider and the client are connected by wire.

* * * * *